(12) United States Patent
Vinogradov et al.

(10) Patent No.: US 11,335,105 B2
(45) Date of Patent: May 17, 2022

(54) METHODS AND SYSTEMS TO FOCUS AN IMAGER FOR MACHINE VISION APPLICATIONS

(71) Applicant: ZEBRA TECHNOLOGIES CORPORATION, Lincolnshire, IL (US)

(72) Inventors: Igor Vinogradov, Oakdale, NY (US); Miroslav Trajkovic, Setauket, NY (US); Heng Zhang, Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 343 days.

(21) Appl. No.: 16/596,704

(22) Filed: Oct. 8, 2019

(65) Prior Publication Data
US 2021/0103754 A1    Apr. 8, 2021

(51) Int. Cl.
*G06V 20/62* (2022.01)
*H04N 5/232* (2006.01)
*G06V 10/20* (2022.01)

(52) U.S. Cl.
CPC ............ *G06V 20/63* (2022.01); *G06V 10/255* (2022.01); *H04N 5/23212* (2013.01)

(58) Field of Classification Search
CPC .............. G05B 19/00; G05B 19/41865; G05B 2219/45063; G05B 2219/40005; G05B 2219/45047; G05B 19/4182; G06K 7/1456
See application file for complete search history.

(56) References Cited

U.S. PATENT DOCUMENTS

| | | | | |
|---|---|---|---|---|
| 10,830,927 B2* | 11/2020 | Nunnink | ............ | G06K 7/10544 |
| 2003/0103651 A1* | 6/2003 | Novak | .................. | G01C 15/00 |
| | | | | 382/106 |
| 2003/0201327 A1* | 10/2003 | Jam | .................... | G06K 7/10811 |
| | | | | 235/462.22 |
| 2003/0201328 A1* | 10/2003 | Jam | .................... | G06K 7/10811 |
| | | | | 235/462.22 |
| 2010/0147956 A1* | 6/2010 | Wang | ................ | G06K 7/10801 |
| | | | | 235/472.01 |
| 2010/0276493 A1* | 11/2010 | Havens | ............. | G06K 7/10831 |
| | | | | 359/666 |

(Continued)

OTHER PUBLICATIONS

Combined Search and Examination Report for UK Patent Application No. GB2015903.4 dated Mar. 30, 2021.

*Primary Examiner* — Dung Hong
(74) *Attorney, Agent, or Firm* — Yuri Astvatsaturov (57) ABSTRACT

Methods and systems to focus an imager for machine vision applications are disclosed. A disclosed example machine vision method includes: capturing, via an imaging assembly, an image of an indicia appearing within a field of view (FOV) of the imaging assembly; recognizing, via a controller, the indicia as a focus adjustment trigger, the focus adjustment trigger operative to trigger an adjustment of at least one focus parameter associated with the imaging assembly; adjusting the at least one focus parameter based at least in part on the indicia; locking the at least one focus parameter such that the at least one focus parameter remains unaltered for a duration; and responsive to the locking of the at least one focus parameter, capturing, via the imaging assembly, at least one subsequent image of an object of interest.

12 Claims, 2 Drawing Sheets

(56) References Cited

U.S. PATENT DOCUMENTS

| | | | |
|---|---|---|---|
| 2011/0089245 A1* | 4/2011 | Havens | H04N 5/2254 |
| | | | 359/666 |
| 2014/0078341 A1* | 3/2014 | Havens | G06K 7/10752 |
| | | | 348/229.1 |
| 2014/0160329 A1* | 6/2014 | Ren | H04N 5/3454 |
| | | | 348/294 |
| 2014/0183264 A1* | 7/2014 | Nunnink | G02B 23/145 |
| | | | 235/462.24 |
| 2014/0239071 A1* | 8/2014 | Hennick | G06K 7/1439 |
| | | | 235/455 |
| 2015/0186703 A1* | 7/2015 | Chen | G06K 7/10564 |
| | | | 235/462.24 |
| 2015/0310243 A1* | 10/2015 | Ackley | G02B 26/0875 |
| | | | 235/462.24 |
| 2016/0104019 A1* | 4/2016 | Todeschini | G06K 7/1426 |
| | | | 235/472.01 |
| 2017/0076428 A1* | 3/2017 | Ishikawa | H04N 9/3194 |
| 2017/0323173 A1* | 11/2017 | Hall | G06V 10/23 |
| 2018/0314866 A1* | 11/2018 | Kotula | G06T 7/0004 |
| 2019/0130151 A1* | 5/2019 | Lee | G06V 10/751 |
| 2019/0286864 A1* | 9/2019 | Jarugubilli | G06K 7/1417 |
| 2020/0356798 A1* | 11/2020 | Kotula | G06V 10/40 |

\* cited by examiner

METHODS AND SYSTEMS TO FOCUS AN IMAGER FOR MACHINE VISION APPLICATIONS

FIELD OF THE DISCLOSURE

This disclosure relates generally to machine vision, and, more particularly, to methods and systems to focus an imager for machine vision applications.

BACKGROUND OF THE INVENTION

Machine vision is use of automated imaging-based inspection and analysis for such applications as part inspection, process control, and robot guidance, usually in industry. In typical machine vision systems, focusing distance of an imaging system is fixed. If necessary, the focus has to be manually adjusted to a particular distance to focus on an object of interest. However, manual focusing requires an external computer and display for an operator. If no computer with a display is available and a limited number of discrete focusing position is used, then the focusing may be not accurate enough. While an autofocus system can alleviate this problem they tend to be slow and cannot be used effectively in a moving system such as a conveyer belt. In a presence of multiple objects within the field of view (FOV) of an imager, an auto focus algorithm may select a wrong object to focus on, which may result in a blurry image of an intended object of interest. Accordingly, there is a need for solutions that solve issues regarding focusing of imaging systems for machine vision systems.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Connecting lines or connectors shown in the various figures presented are intended to represent example functional relationships and/or physical or logical couplings between the various elements. In general, the same reference numbers will be used throughout the drawing(s) and accompanying written description to refer to the same or like parts.

Elements in the figures are illustrated for simplicity and clarity and have not necessarily been drawn to scale. For example, components may been represented where appropriate by conventional symbols in the drawings, and may show only those specific details that are pertinent to understanding the embodiments of the invention so as not to obscure the disclosure with details that will be readily apparent to those of ordinary skill in the art having the benefit of the description herein. Further, the dimensions of some of the elements in the figures may be exaggerated relative to other elements to help to improve understanding of embodiments of the invention.

DETAILED DESCRIPTION

In various embodiments of the present disclosure, methods and machine vision systems to focus based on special-purpose indicia present on or presented in connection with an object of interest are disclosed. Example imaging systems have an electronically controllable focusing mechanism, such as a liquid lens or a voice coil motor, which are traditionally used in auto focusing systems. Benefits can be obtained by adjusting and freezing focus at the right distance for an object of interest based on a special indicia (e.g., a barcode, a fiducial mark, or any other special designated pattern) presented on the object of interest, in connection with an object of interest, etc. When an imaging system sees the indicia it identifies a focus distance to an imaging plane for the object of interest based on the indicia, focusses at that focus distance and freezes the focus parameters for that focus distance. When multiple objects are present within a camera's FOV, a traditional auto focus algorithm may not select the intended object of interest and, thus, not properly focus on the intended object of interest. However, with the use of a special-purpose indicia the machine vision system can determine, based on the indicia, the focus distance for an intended object of interest, focus and freeze focus parameters for that distance, and capture a correctly focused image of the intended object of interest. The use of indicia to determine, set and freeze focus distances reduces or eliminates the need for auto-focusing, thereby obtaining several benefits including reducing system complexity, reducing cost, reducing man power, reducing misfocus, reduce focusing on incorrect object of interest, increasing system throughput, for example. Furthermore, the machine vision system can search for an object of interest starting from the focus distance indicated by the indicia. Focus distance information may be encoded in the special-purposed indicia using, for example, a pattern of the indicia, etc.

A disclosed example machine vision method includes: capturing, via an imaging assembly, an image of an indicia appearing within a field of view (FOV) of the imaging assembly; recognizing, via a controller, the indicia as a focus adjustment trigger, the focus adjustment trigger operative to trigger an adjustment of at least one focus parameter associated with the imaging assembly; adjusting the at least one focus parameter based at least in part on the indicia; locking the at least one focus parameter such that the at least one focus parameter remains unaltered for a duration; and responsive to the locking of the at least one focus parameter, capturing, via the imaging assembly, at least one subsequent image of an object of interest.

A disclosed example machine vision system includes an imaging assembly, a processor, and a non-transitory machine-readable memory storing machine-readable instructions that, when executed by the processor, cause the machine vision system to: capture, via the imaging assembly, an image of an indicia appearing within a field of view (FOV) of the imaging assembly; recognize the indicia as a focus adjustment trigger, the focus adjustment trigger operative to trigger an adjustment of at least one focus parameter associated with the imaging assembly; adjust the at least one focus parameter based at least in part on the indicia; lock the at least one focus parameter such that the at least one focus parameter remains the unaltered for a duration; and responsive to the locking of the at least one focus parameter, capture, via the imaging assembly, at least one subsequent image of an object of interest.

Another disclosed example machine vision system includes: an imaging sensor configured to capture an image of an indicia appearing within a field of view (FOV) of the imaging assembly; a controller configured to recognize the indicia as a focus adjustment trigger and, responsive to the recognition, determine at least one focus parameter based on the indicia responsive to recognition; and a focus controller configured to adjust at least one focus element according to the at least one focus parameter and lock the at least one focus parameter such that the at least one focus parameter remains unaltered for a duration, wherein responsive to the locking of the at least one focus parameter, capturing with the imaging sensor at least one subsequent image of an object of interest.

Reference will now be made in detail to non-limiting examples, some of which are illustrated in the accompanying drawings.

Figure 1:
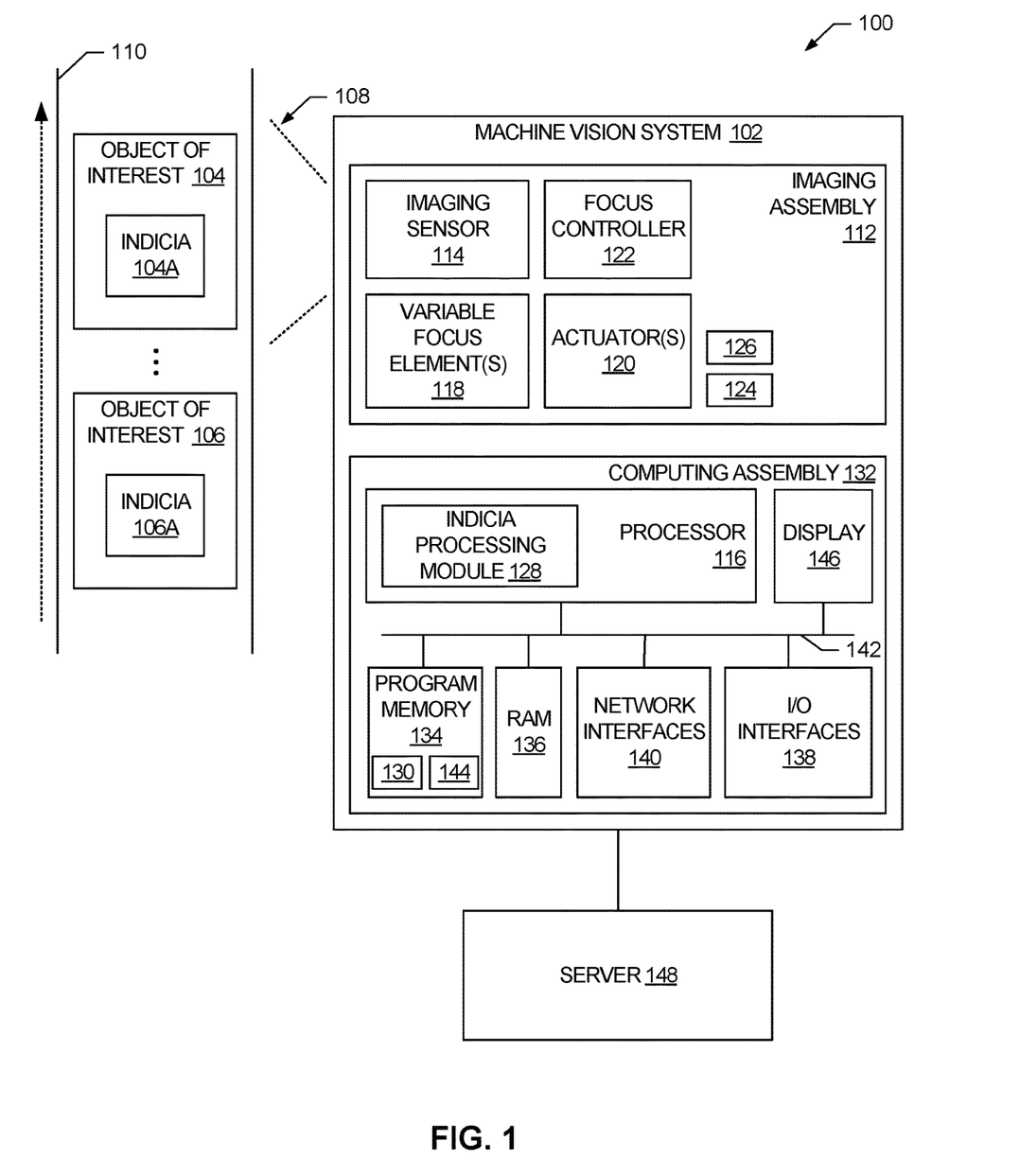
FIG. 1 illustrates a machine vision system, in accordance with aspects of this disclosure.

FIG. 1 illustrates an example environment 100 where embodiments of this disclosure may be implemented. In the illustrated example of FIG. 1, the environment 100 includes a machine vision system 102 where objects of interest (two of which are designated at reference numerals 104 and 106) are moved through a FOV 108 of the machine vision system 102 or placed in the FOV 108 for imaging and inspection. For example, the objects of interest 104, 106 may be moving on a scanning surface 110 such as on a conveyor belt, along an assembly line, etc. The objects of interest 104, 106 may be moved continuously relative to the FOV 108 of the machine vision system 102, or moved in a discretized manner where at least part of the time an object of interest 104, 106 is held still for a period of time sufficient to allow one or more images to be captured of the object of interest 104, 106.

To capture images, the example machine vision system 102 includes an imaging assembly 112 having any number and/or type(s) of imaging sensor 114 (e.g., a complementary metal-oxide semiconductor (CMOS) imaging array). The imaging sensor 114 under control of, for example, a processor 116 captures one or more images of an object of interest 104, 106.

To focus on objects of interest, the example imaging assembly 112 includes any number and/or type(s) of variable focus elements 118 positioned between the imaging sensor 114 and a window (not shown) of the machine vision system 102, and any number and/or type(s) of actuators 120 to activate, operate, etc. the variable focus elements 118 under the control of a focus controller 122. Example variable focus elements 118 include, but are not limited to, a liquid lens, a voice coil motor, etc. Example actuators 120 include a focusing lens drive, a shift lens drive, a zoom lens drive, an aperture drive, angular velocity drive, voice coil motor drive, etc. In the illustrated example, the processor 116 sets one or more focus parameters, two of which are designated at reference numbers 124 and 126, that the focus controller 122 uses to control the actuators 120. In this manner, the processor 116 can control the focus distance to an imaging plane of the imaging assembly 112 to an intended or needed focus distance. In some examples, the imaging assembly 112 is configured such that if the imaging assembly 112 has an autofocus module or autofocus operation that the autofocus operation is disabled for at least one image capture operation and focus distance is controlled by the processor 116 via the focus parameters 124, 126 for that image capture operation.

To identify to the machine vision system 102 the focus distance(s) at which an object of interest 104, 106 is to be imaged, objects of interest 104, 106 have one or more respective indicia, two of which are designated at reference numerals 104A and 106A. In some examples, more than one indicia 104A, 106A is associated with an object of interest 104, 106. Additionally or alternatively, an indicia 104A, 106A may represent more than one focus distance for more than one object of interest 104, 106. When the indicia 104A, 106A represent multiple focus distances for an object of interest 104, 106, the focus distances may be associated with different portions, parts, members, aspects, etc. of an object of interest 104, 106. An indicia 104A, 106A need not be positioned at the focus distance(s) represented by the indicia 104A, 106A. For example, an indicia 104A, 106A may be sized and placed to be recognized without the use of auto-focus, the indicia 104A, 106A may be placed at a default focus distance the machine vision system 102 uses to image and identify indicia 104A, 106A, etc. Indicia 104A, 106A may be placed on an object of interest 104, 106, alongside an object of interest 104, 106, etc. Example indicia 104A, 106A include, but are not limited to, a barcode (one-dimensional (1D), two-dimensional (2D) or three-dimensional (3D)), a fiducial mark, or any other special designated pattern that may be used to convey information.

In some examples, the imaging assembly 112 is fixedly mounted at a known location and is selectively focusable on objects of interest 104, 106 that are different distances away from the known location based on focus distances encoded in indicia 104A, 106A. In some examples, the imaging assembly 112 is moveably mounted and positionable (e.g., in one, two or three dimensions) at different known positions, and is focused on objects of interest 104, 106 that are different distances away relative to a current known position based on focus distances encoded in indicia 104A, 106A. In some instances, an indicia 104A, 106A encodes imaging assembly position and focus distance(s). The indicia 104A, 106A may further encode other imaging properties such as zoom, aperture, etc.

When an indicia processing module 128 recognizes an indicia 104A, 106A in an image as a focus adjustment trigger, the indicia processing module 128 decodes the indicia 104A, 106A to obtain predetermined payload data or information encoded in the indicia 104A, 106A. Example payload data or information includes focus distances to imaging planes, size or dimensions of an object of interest 104, 106. The payload data or information may be encoded in the indicia 104A, 106A according to any past, present or future industry standard such as Code 39 barcodes, GS1 barcodes, Interleaved 2 of 5 (ITF) barcodes, etc. The processor 116 determines configures the imaging assembly 112 to each of the identified focus distances. In some examples, the processor 116 queries a focus parameter database 130 to obtain the focus parameters 124, 126 corresponding to the focus distance identified by a captured indicia 104A, 106A. In some examples, the known dimension(s) of an indicia 104A, 106A, the current known FOV, and the size of the indicia 104A, 106A in an image (e.g., in pixels) can be used to determine (e.g., calculate, estimate, etc.) the distance to the indicia 104A, 106A. In some examples, the FOV is considered constant or fixed regardless of focus distance. In some examples, the focus distance can be calibrated using a frozen focus and calibrated FOV.

For each identified focus distance to an imaging plane, the processor 116 writes, stores, etc. the corresponding focus parameters 124, 126 to the imaging assembly 112, and controls the focus controller 122 to set the focus distance of the imaging assembly 112 according to the focus parameters 124, 126, and freeze (e.g., maintain, hold, lock, etc.) the focus parameters 124, 126. Once the focus distance has been set, the processor 116 controls the imaging sensor 114 to capture one or more images of an object of interest 104, 106. Because the focus distance is known a priori to correspond to the object of interest 104, 106, a captured image will be properly focused for one or more desired aspects of the object of interest 104, 106, and non-desired aspects or other objects cannot result in improper focus. In some examples, the number of images to capture is encoded in the indicia 104A, 106A. When a number of images is to be captured, the indicia 104A, 106A may further encode times between image captures to accommodate, for example, movement of a conveyor belt, assembly line, etc. The time duration that focus parameters 124, 126 are held may be until another or subsequent indicia focus adjustment trigger is identified. In examples including auto-focus, the focus distance encoded in an indicia 104A, 106A can be used to set a starting focus distance for auto-focus to, for example, accommodate variations in object of interest to imaging sensor separation.

In the illustrated example of FIG. 1, the machine vision system 102 includes a computing assembly 132 that includes one or more processors (one of which is designated at reference numeral 116), program memory 134, random-access memory (RAM) 136, input/output (I/O) interfaces 138, and network interfaces 140, all of which are interconnected via an address/data bus 142. The program memory 134 may store software and/or instructions 144, which may be executed by the processor 116. Different portions of the example machine vision system 102, for example, the imaging assembly 112 and the computing assembly 132, may be implemented separately by different computing systems. Thus, the processor 116 and the focus controller 122 may be implemented as two different processors and/or controllers. However, in other examples, the processor 116 and the focus controller 122 are implemented by the same processor and/or controller.

The processor 116 and the focus controller 122 of the illustrated example may be hardware, and may be semiconductor based (e.g., silicon based) devices. Example processors 116 and focus controller 122 include a programmable processor, a programmable controller, a graphics processing unit (GPU), a digital signal processor (DSP), an application specific integrated circuit (ASIC), a programmable logic device (PLD), a field programmable gate array (FPGA), a field programmable logic device (FPLD), etc. In this example, the processor 116 implements the indicia processing module 128. In some examples, the processor 116 implements instructions that inspect objects of interest 104, 106 using images taken based on focus distances determined from indicia 104A, 106A.

The program memory 134 may include any number and/or type(s) of volatile and/or non-volatile storage media or disks storing the software, machine- or computer-readable instructions, or computer- or machine-executable instructions 144, and the focus parameter database 130. The software and instructions 144 may be executed by the processor 116 to implement the indicia processing module 128, and inspect objects of interest 104, 106 using images taken based on focus distances determined from indicia. The software and instructions 144 may be stored on separate non-transitory computer- or machine-readable storage mediums or disks, or at different physical locations.

The memories 134, 136 include any number or type(s) of volatile or non-volatile non-transitory computer- or machine-readable storage media or disks, such as a semiconductor memory, a magnetically readable memory, an optically readable memory, a hard disk drive (HDD), an optical storage drive, a solid-state storage device, a solid-state drive (SSD), a read-only memory (ROM), a RAM, a compact disc (CD), a compact disc read-only memory (CD-ROM), a digital versatile disk (DVD), a Blu-ray disk, a redundant array of independent disks (RAID) system, a cache, a flash memory, or any other storage device or storage disk in which information may be stored for any duration (e.g., permanently, for an extended time period, for a brief instance, for temporarily buffering, for caching of the information, etc.).

As used herein, the term non-transitory computer-readable medium is expressly defined to include any type of computer-readable storage device and/or storage disk and to exclude propagating signals and to exclude transmission media. As used herein, the term non-transitory machine-readable medium is expressly defined to include any type of machine-readable storage device and/or storage disk and to exclude propagating signals and to exclude transmission media.

The I/O interfaces 138 may include any number and/or type(s) of different types of I/O circuits or components that enable the processor 116 to communicate with peripheral I/O devices. Example I/O interfaces 138 include a universal serial bus (USB), a Bluetooth® interface, a near field communication (NFC) interface, an infrared transceiver, and/or a PCI express interface. The peripheral I/O devices may be any desired type of I/O device such as a keyboard, a display 146 (a liquid crystal display (LCD), a cathode ray tube (CRT) display, a light emitting diode (LED) display, an organic light emitting diode (OLED) display, an in-place switching (IPS) display, a touch screen, etc.), a navigation device (a mouse, a trackball, a capacitive touch pad, a joystick, etc.), a speaker, a microphone, a printer, a button, a communication interface, an antenna, etc.

The machine vision system 102 includes one or more network interfaces 140 for connecting the machine vision system 102 to a server 148. These devices may be connected via any suitable communication means, including wired and/or wireless connectivity components that implement one or more past, present or future industry communication protocol standards like, for example, a TCP/IP interface, a Wi-Fi™ transceiver (according to the 802.11 family of standards), an Ethernet transceiver, a cellular network radio, a satellite network radio, a cable modem, a digital subscriber line (DSL) modem, a dialup modem, or any other suitable communication protocols or standards.

In some embodiments, the imaging assembly 112 is implemented separately from other parts of the machine vision system 102 (e.g., separately from the computing assembly 132) and is coupled to the other parts of the machine vision system 102 via the I/O interfaces 138 and/or the network interfaces 140. In some such embodiments, the other parts of the machine vision system 102 are implemented on a cloud-based platform at a remote location.

While an example machine vision system 102 is illustrated in FIG. 1, one or more of the elements, processes and/or devices illustrated in FIG. 1 may be combined, divided, re-arranged, omitted, eliminated and/or implemented in any other way. For example, the processor 116 and the focus controller 122 may be implemented by the same programmable processor, programmable controller, GPU, DSP, an ASIC, a PLD, an FPGA, an FPLD, etc. Further, the machine vision system 102 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In some examples, the server 148 includes, among other things, program memory storing software or instructions that, when executed by a processor of the server 148 cause the server 148 to inspect objects of interest 104, 106 based on images taken by the machine vision system 102 using focus distances determined from indicia 104A, 106A.

In some embodiments, the server 148 (and/or other connected devices) may be located in the same location as the machine vision system 102. In other embodiments, server 148 (and/or other connected devices) may be located at a remote location, such as on a cloud-platform or other remote location. In still other embodiments, server 148 (and/or other connected devices) may be formed of a combination of local and cloud-based computers.

Figure 2:
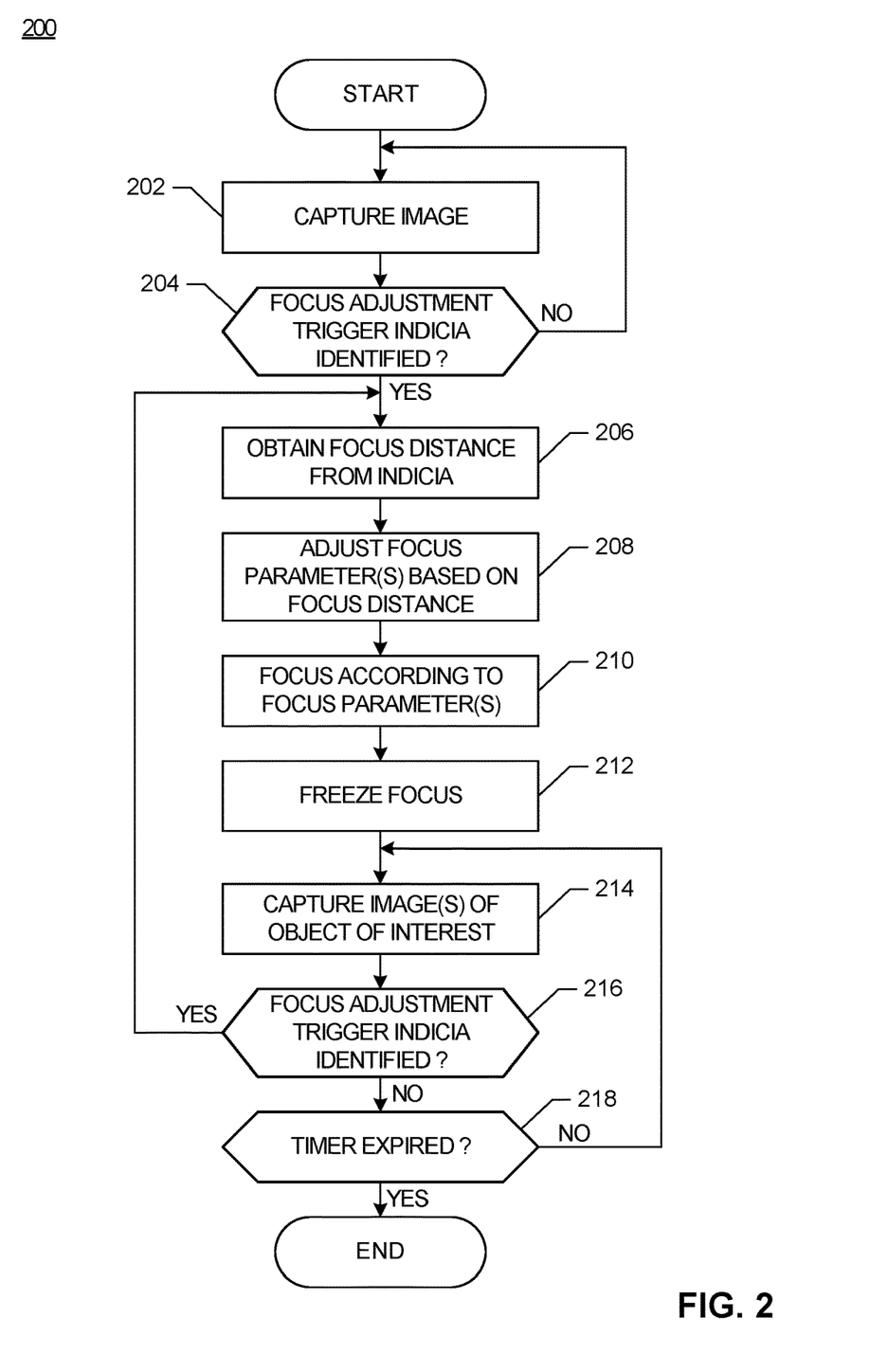
FIG. 2 is a flowchart representative of example method, hardware logic and instructions for implementing the machine vision system of FIG. 1.

A flowchart 200 representative of example processes, methods, software, firmware, and computer- or machine-readable instructions for implementing the machine vision system 102 of FIG. 1 is shown in FIG. 2. The processes, methods, software and instructions may be an executable program or portion of an executable program for execution by a processor such as the processor 116 and/or the focus controller 122. The program may be embodied in software or instructions stored on a non-transitory computer- or machine-readable storage medium or disk associated with the processor 116 and/or the focus controller 122. Further, although the example program is described with reference to the flowchart illustrated in FIG. 2, many other methods of implementing the example machine vision systems 102 may alternatively be used. For example, the order of execution of the blocks may be changed, and/or some of the blocks described may be changed, eliminated, or combined. Additionally, or alternatively, any or all of the blocks may be implemented by one or more hardware circuits (e.g., discrete and/or integrated analog and/or digital circuitry, an ASIC, a PLD, an FPGA, an FPLD, a logic circuit, etc.) structured to perform the corresponding operations without executing software or firmware. Of course, a combination of the two approaches could be used.

The process of FIG. 2 begins with imaging sensor 114 capturing an image (block 202), and the indicia processing module 128 identifying whether a focus adjustment trigger indicia 104, 106 is present in the image (block 204). If a focus adjustment trigger indicia 104, 106 is present in the image (block 204), the indicia processing module 128 determines focus distance data or information from the indicia 104, 106 (block 206), and the processor 116 determines one or more focus parameters 124, 126 based on the focus distance data (block 208). The focus controller 122 controls focusing of the imaging assembly 112 according to the focus parameters 124, 126 (block 210), and freezes the focusing (block 212). One or more images are captured of one or more objects of interest 104, 106 using the frozen focusing (block 214) until, for example, another focus adjustment trigger indicia 104, 106 is identified (block 216) and control returns to block 204. Otherwise, if, for example, a timer expires (block 2168), control exits from the example process of FIG. 2.

Example methods and systems to focus an imager for machine vision applications are disclosed herein. Further examples and combinations thereof include at least the following.

Example 1 is a machine vision method comprising: capturing, via an imaging assembly, an image of an indicia appearing within a field of view (FOV) of the imaging assembly; recognizing, via a controller, the indicia as a focus adjustment trigger, the focus adjustment trigger operative to trigger an adjustment of at least one focus parameter associated with the imaging assembly; adjusting the at least one focus parameter based at least in part on the indicia; locking the at least one focus parameter such that the at least one focus parameter remains unaltered for a duration; and responsive to the locking of the at least one focus parameter, capturing, via the imaging assembly, at least one subsequent image of an object of interest.

Example 2 is the machine vision method of example 1, wherein the duration extends until a subsequent indicia appears within the FOV of the imaging assembly, and wherein the subsequent indicia is recognized as another focus adjustment trigger for another object of interest.

Example 3 is the machine vision method of example 1 or example 2, further comprising determining, via the controller, a focus distance to an imaging plane based at least in part on the indicia, wherein the adjusting the at least one focus parameter includes the adjusting the at least one focus parameter based at least in part on the focus distance.

Example 4 is the machine vision method of example 3, wherein determining, via the controller, the focus distance to the imaging plane based at least in part on the indicia includes determining the focus distance to the imaging plane based at least in part on payload data conveyed by the indicia.

Example 5 is the machine vision method of example 4, further comprising decoding, via the controller, payload data of the indicia to determine the focus distance.

Example 6 is the machine vision method of example 4, further comprising: recognizing, via the controller, the indicia according to an industry standard; and determining, via the controller, the payload data based on recognizing that the indicia conforms to the industry standard.

Example 7 is the machine vision method of example 3, wherein determining, via the controller, the focus distance to the imaging plane based at least in part on the indicia includes decoding the indicia to read predetermined distance data.

Example 8 is the machine vision method of any of examples 1 to 7, wherein adjusting the at least one focus parameter based at least in part on the indicia includes focusing, via an autofocus module, the imaging assembly on the indicia.

Example 9 is the machine vision method of any of examples 1 to 8, further comprising: further adjusting the at least one focus parameter based at least in part on the indicia; locking the further adjusted at least one focus parameter such that the further adjusted at least one focus parameter remains unaltered for another duration; and responsive to the locking of the further adjusted at least one focus parameter, capturing, via the imaging assembly, at least one additional subsequent image of another object of interest.

Example 10 is a machine vision system comprising: an imaging assembly; one or more processors; and a non-transitory machine-readable memory storing machine-readable instructions that, when executed by the one or more processors, cause the machine vision system to: capture, via the imaging assembly, an image of an indicia appearing within a field of view (FOV) of the imaging assembly; recognize the indicia as a focus adjustment trigger, the focus adjustment trigger operative to trigger an adjustment of at least one focus parameter associated with the imaging assembly; adjust the at least one focus parameter based at least in part on the indicia; lock the at least one focus parameter such that the at least one focus parameter remains unaltered for a duration; and responsive to the locking of the at least one focus parameter, capture, via the imaging assembly, at least one subsequent image of an object of interest.

Example 11 is the machine vision system of example 10, wherein the duration extends until a subsequent indicia appears within the FOV of the imaging assembly, and wherein the subsequent indicia is recognized as another focus adjustment trigger.

Example 12 is the machine vision system of example 10 or example 11, including further machine-readable instructions that, when executed by the one or more processors, further cause the machine vision system to determine a focus distance to an imaging plane based at least in part on the indicia, wherein the adjusting the at least one focus parameter includes the adjusting the at least one focus parameter based at least in part on the focus distance.

Example 13 is the machine vision system of example 12, including further machine-readable instructions that, when executed by the one or more processors, further cause the machine vision system to determine the focus distance to the imaging plane based at least in part on the indicia includes determining the focus distance to the imaging plane based at least in part on payload data conveyed by the indicia.

Example 14 is the machine vision system of example 13, including further machine-readable instructions that, when executed by the one or more processors, further cause the machine vision system to decode payload data of the indicia to determine the focus distance.

Example 15 is the machine vision system of example 13, including further machine-readable instructions that, when executed by the one or more processors, further cause the machine vision system to: recognize the indicia according to an industry standard; and determine the payload data based on recognizing that the indicia conforms to the industry standard.

Example 16 is the machine vision system of example 12, including further machine-readable instructions that, when executed by the one or more processors, further cause the machine vision system to determine the focus distance to the imaging plane based at least in part on the indicia includes decoding the indicia to read distance data.

Example 17 is the machine vision system of any of examples 10 to 16, including further machine-readable instructions that, when executed by the one or more processors, further cause the machine vision system to adjust the at least one focus parameter based at least in part on the indicia includes focusing, via an autofocus module, the imaging assembly on the indicia.

Example 18 is the machine vision system of any of examples 10 to 17, including further machine-readable instructions that, when executed by the one or more processors, further cause the machine vision system to: further adjust the at least one focus parameter based at least in part on the indicia; lock the further adjusted at least one focus parameter such that the further adjusted at least one focus parameter remains unaltered for another duration; and responsive to the locking of the further adjusted at least one focus parameter, capture, via the imaging assembly, at least one additional subsequent image of another object of interest.

Example 19 is a machine vision system comprising: an imaging sensor configured to capture an image of an indicia appearing within a field of view (FOV) of the imaging sensor; a first processor configured to recognize the indicia as a focus adjustment trigger and, responsive to the recognition of the indicia as the focus adjustment trigger, determine at least one focus parameter based on the indicia responsive to recognition; and a second processor configured to adjust at least one focus element according to the at least one focus parameter and lock the at least one focus parameter such that the at least one focus parameter remains unaltered for a duration, wherein responsive to the locking of the at least one focus parameter, capturing with the imaging sensor at least one subsequent image of an object of interest.

Example 20 is the machine vision system of example 19, wherein the first processor determines the at least one focus parameter based on the indicia by determining a focus distance based at least in part on the indicia, and determining the at least one focus parameter based at least in part on the focus distance.

In the foregoing specification, specific embodiments have been described. However, one of ordinary skill in the art appreciates that various modifications and changes can be made in view of aspects of this disclosure without departing from the scope of the invention as set forth in the claims below. Accordingly, the specification and figures are to be regarded in an illustrative rather than a restrictive sense, and all such modifications made in view of aspects of this disclosure are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, A, B or C refers to any combination or subset of A, B, C such as (1) A alone, (2) B alone, (3) C alone, (4) A with B, (5) A with C, (6) B with C, and (7) A with B and with C. As used herein, the phrase "at least one of A or B" is intended to refer to implementations including any of (1) at least one A, (2) at least one B, and (3) at least one A and at least one B. Similarly, the phrase "at least one of A and B" is intended to refer to implementations including any of (1) at least one A, (2) at least one B, and (3) at least one A and at least one B. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

As used herein, the expressions "in communication," "coupled" and "connected," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim and/or combinations thereof standing on its own as a separately claimed subject matter.

This patent covers all methods, apparatus and articles of manufacture fairly falling within the scope of the claims of this patent.

What is claimed is:

1. A machine vision method comprising:
    capturing, via an imaging assembly, an image of an indicia appearing within a field of view (FOV) of the imaging assembly;
    recognizing, via a controller, the indicia as a focus adjustment trigger, the focus adjustment trigger operative to trigger an adjustment of at least one focus parameter associated with the imaging assembly;
    determining, via the controller, a focus distance to an imaging plane based at least in part on the indicia;
    adjusting the at least one focus parameter based at least in part on the indicia by adjusting the at least one focus parameter based at least in part on the focus distance;
    locking the at least one focus parameter such that the at least one focus parameter remains unaltered for a duration; and
    responsive to the locking of the at least one focus parameter, capturing, via the imaging assembly, at least one subsequent image of an object of interest,
    wherein determining, via the controller, the focus distance to the imaging plane based at least in part on the indicia includes determining the focus distance to the imaging plane based at least in part on (i) payload data conveyed by the indicia, and/or (ii) decoding the indicia to read predetermined distance data.

2. The machine vision method of claim 1, wherein the duration extends until a subsequent indicia appears within the FOV of the imaging assembly, and wherein the subsequent indicia is recognized as another focus adjustment trigger for another object of interest.

3. The machine vision method of claim 1, further comprising decoding, via the controller, payload data of the indicia to determine the focus distance.

4. The machine vision method of claim 1, further comprising:
    recognizing, via the controller, the indicia according to an industry standard; and
    determining, via the controller, the payload data based on recognizing that the indicia conforms to the industry standard.

5. The machine vision method of claim 1, wherein adjusting the at least one focus parameter based at least in part on the indicia includes focusing, via an autofocus module, the imaging assembly on the indicia.

6. The machine vision method of claim 1, further comprising:
    further adjusting the at least one focus parameter based at least in part on the indicia;
    locking the further adjusted at least one focus parameter such that the further adjusted at least one focus parameter remains unaltered for another duration; and
    responsive to the locking of the further adjusted at least one focus parameter, capturing, via the imaging assembly, at least one additional subsequent image of another object of interest.

7. A machine vision system comprising:
    an imaging assembly;
    one or more processors; and
    a non-transitory machine-readable memory storing machine-readable instructions that, when executed by the one or more processors, cause the machine vision system to:
        capture, via the imaging assembly, an image of an indicia appearing within a field of view (FOV) of the imaging assembly;
        recognize the indicia as a focus adjustment trigger, the focus adjustment trigger operative to trigger an adjustment of at least one focus parameter associated with the imaging assembly;
        determine a focus distance to an imaging plane based at least in part on (i) payload data conveyed by the indicia, and/or (ii) decoding the indicia to read distance data;
        adjust the at least one focus parameter based at least in part on the indicia by adjusting the at least one focus parameter based at least in part on the focus distance;
        lock the at least one focus parameter such that the at least one focus parameter remains unaltered for a duration; and
        responsive to the locking of the at least one focus parameter, capture, via the imaging assembly, at least one subsequent image of an object of interest.

8. The machine vision system of claim 7, wherein the duration extends until a subsequent indicia appears within the FOV of the imaging assembly, and wherein the subsequent indicia is recognized as another focus adjustment trigger.

9. The machine vision system of claim 7, including further machine-readable instructions that, when executed by the one or more processors, further cause the machine vision system to decode payload data of the indicia to determine the focus distance.

10. The machine vision system of claim 7, including further machine-readable instructions that, when executed by the one or more processors, further cause the machine vision system to:
    recognize the indicia according to an industry standard; and
    determine the payload data based on recognizing that the indicia conforms to the industry standard.

11. The machine vision system of claim 7, including further machine-readable instructions that, when executed by the one or more processors, further cause the machine vision system to adjust the at least one focus parameter based at least in part on the indicia includes focusing, via an autofocus module, the imaging assembly on the indicia.

12. The machine vision system of claim 7, including further machine-readable instructions that, when executed by the one or more processors, further cause the machine vision system to:
further adjust the at least one focus parameter based at least in part on the indicia;
lock the further adjusted at least one focus parameter such that the further adjusted at least one focus parameter remains unaltered for another duration; and
responsive to the locking of the further adjusted at least one focus parameter, capture, via the imaging assembly, at least one additional subsequent image of another object of interest.

\* \* \* \* \*